(12) United States Patent
Ishii et al.

(10) Patent No.: US 9,036,958 B2
(45) Date of Patent: May 19, 2015

(54) OPTICAL COMPONENT

(75) Inventors: Motohaya Ishii, Atsugi (JP); Naoki Ooba, Atsugi (JP); Kazunori Seno, Atsugi (JP); Yoshiyuki Doi, Atsugi (JP); Ken Tsuzuki, Atsugi (JP); Takao Fukumitsu, Atsugi (JP); Atsushi Murasawa, Yokohama (JP); Fumihiro Ebisawa, Yokohama (JP); Hiroshi Terui, Yokohama (JP); Tomoyo Shibazaki, Yokohama (JP); Yuichi Kikuchi, Yokohama (JP)

(73) Assignees: NIPPON TELEGRAPH AND TELEPHONE CORPORATION, Tokyo (JP); NTT ELECTRONICS CORPORATION, Yokohama-Shi, Kanagawa (JP)

( * ) Notice: Subject to any disclaimer, the term of this patent is extended or adjusted under 35 U.S.C. 154(b) by 370 days.

(21) Appl. No.: 13/582,954

(22) PCT Filed: Mar. 9, 2011

(86) PCT No.: PCT/JP2011/001390
§ 371 (c)(1),
(2), (4) Date: Sep. 5, 2012

(87) PCT Pub. No.: WO2011/111387
PCT Pub. Date: Sep. 15, 2011

(65) Prior Publication Data
US 2013/0011095 A1  Jan. 10, 2013

(30) Foreign Application Priority Data
Mar. 9, 2010  (JP) .................................. 2010-052147

(51) Int. Cl.
G02B 6/12 (2006.01)
G02B 6/36 (2006.01)
G02B 6/30 (2006.01)
G02B 6/35 (2006.01)

(52) U.S. Cl.
CPC .......... *G02B 6/12009* (2013.01); *G02B 6/3616* (2013.01); *G02B 6/12033* (2013.01); *G02B 6/3508* (2013.01); *G02B 6/30* (2013.01)

(58) Field of Classification Search
CPC ......................... G02B 6/12033; G02B 6/3508
See application file for complete search history.

(56) References Cited

FOREIGN PATENT DOCUMENTS

| | | |
|---|---|---|
| CN | 101384932 | 3/2009 |
| JP | 04-123729 | 4/1992 |
| JP | 2006-093999 | 4/2006 |
| JP | 2009-075290 | 4/2009 |
| JP | 2009-175364 | 8/2009 |
| WO | PCT/JP/2011/001390 | 10/2012 |

OTHER PUBLICATIONS

Machine Translation of JP 2009-075290 to Yasuaki et al. (Sep. 4, 2009), translation recorded Nov. 2, 2014.*
Office Action from corresponding Chinese Patent Application No. 201180012973.1, dated Dec. 25, 2013.
International Search Report Issued Apr. 5, 2011 in Application No. PCT/JP2011/001390m filed Mar. 9, 2011.

* cited by examiner

Primary Examiner — Jerry Rahll
(74) Attorney, Agent, or Firm — Workman Nydegger

(57) ABSTRACT

In an optical component, a part of a waveguide type optical device is fixed to a convex portion of a mount. The optical component includes an optical device support base, a pressure member and a pressure support base. The optical device support base is interposed between the mount and the presser member enough to be slidable in a direction parallel to surfaces of the mount and the presser member.

21 Claims, 8 Drawing Sheets

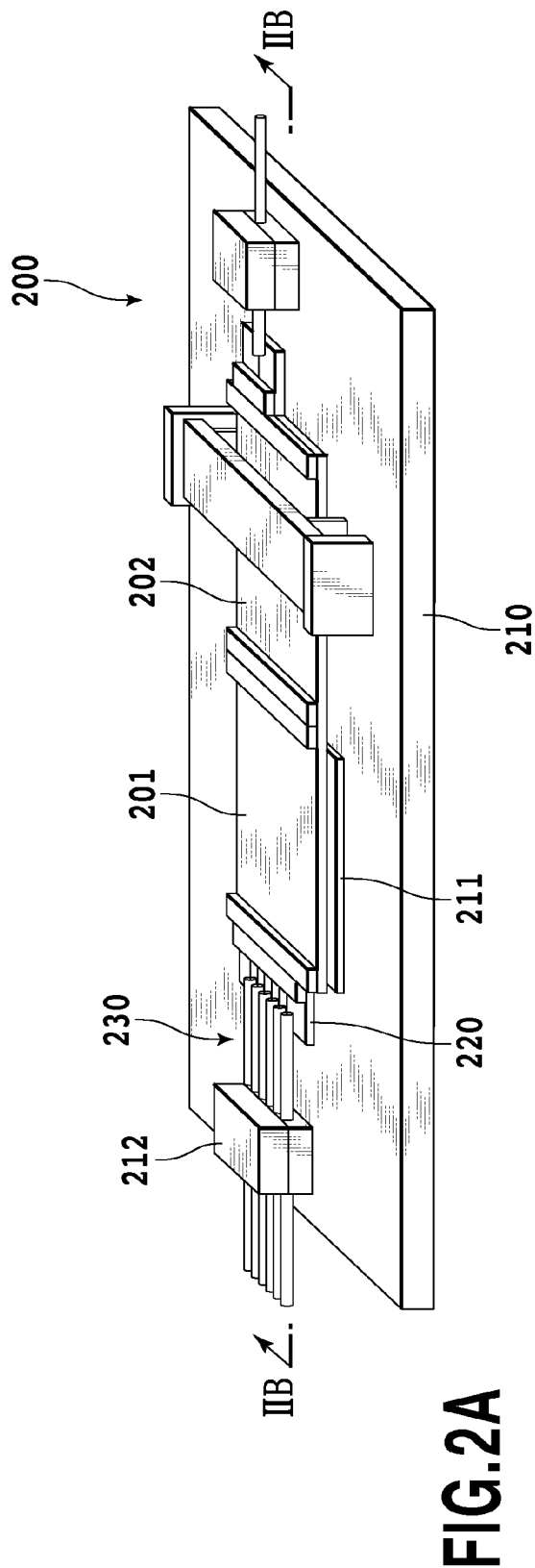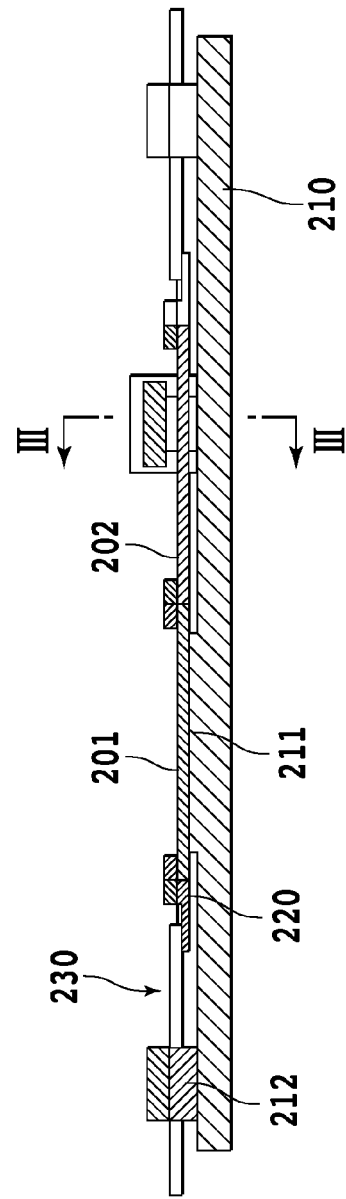
FIG.2A
FIG.2B

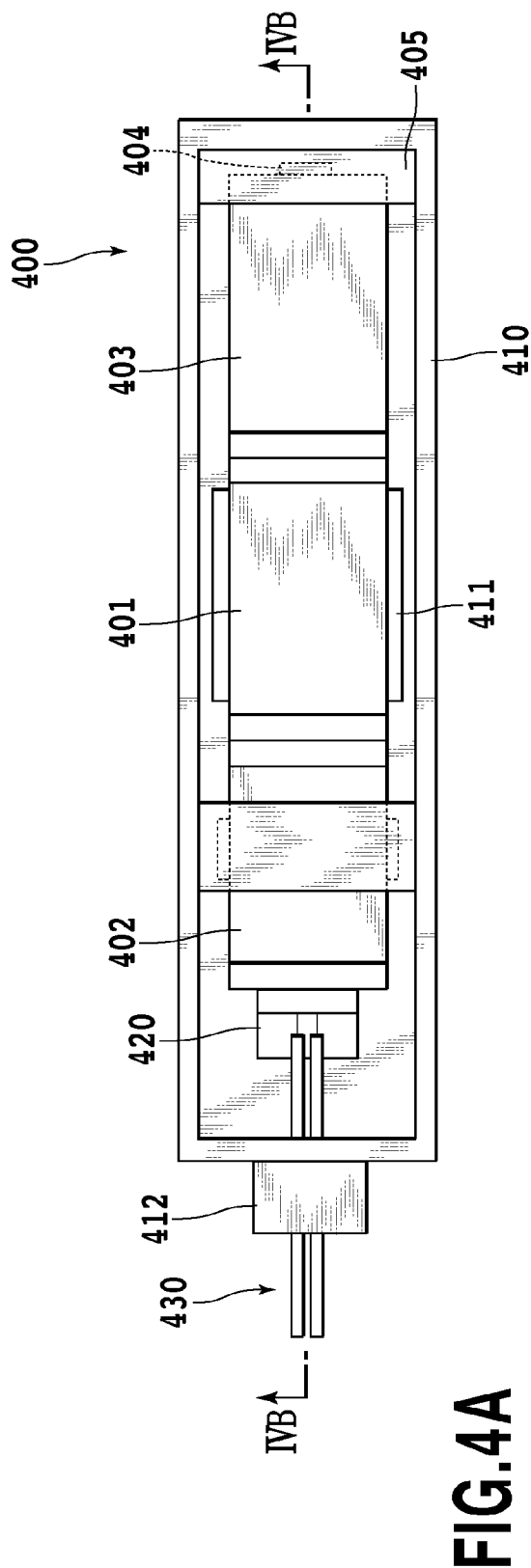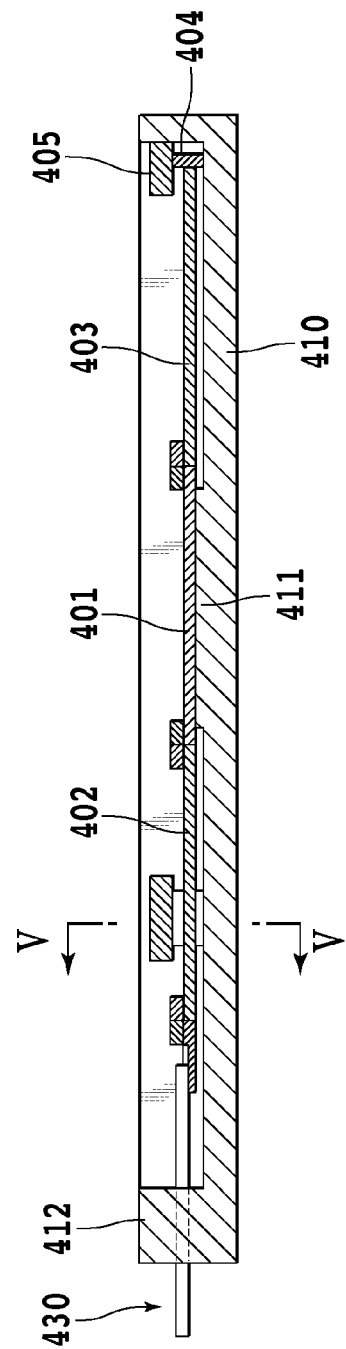
FIG.4A
FIG.4B

OPTICAL COMPONENT

TECHNICAL FIELD

The present invention relates to an optical component, and more specifically to an optical component including a waveguide type optical device.

BACKGROUND ART

With the sophistication of optical communication systems, demand has been increased for highly functional optical modules (optical components). A waveguide type optical device can implement various lightwave circuits by forming an optical waveguide on a substrate, and is being used as a component composing an optical module. For the higher functionalization of optical modules, hybrid optical modules are being implemented by integrating waveguide type optical devices having different functions or by integrating a spatial optical component, such as a lens and a spatial phase modulator, and a waveguide type optical device. Specific examples of optical modules include: (1) a V-AWG module obtained by forming an array waveguide grid (AWG) and a variable optical attenuator (VOA) on different planar lightwave circuits (PLCs) and then optically coupling them; (2) a RZ-DQPSK (Return to Zero Differential Quadrature Phase Shift Keying) module obtained by optically coupling waveguide type optical devices made of different materials such as silica-based glass and lithium niobate (LN); (3) a TODC (Tunable Optical Dispersion Compensator) module obtained by optically coupling a LCOS (Liquid Crystal On Silicon) as a spatial phase modulator and a PLC; and the like.

To reduce the impact attributed to external force such as mechanical vibration and shock, a hybrid optical module is fabricated by fixing a waveguide type optical device such as a PLC onto a mount, but has a drawback of thermal stress to be generated by a difference in thermal expansion coefficients between the waveguide type optical device and the mount. PTL1 discloses a technique of reducing the thermal stress against PLC chip connected portions in an optical module that a device to which multiple PLC chips are connected is fixed onto a mount. When explained with reference to FIGS. 1A to 1C (corresponding to FIG. 1 of PTL1), the hybrid optical module of PTL1 has a structure that a PLC chip 2 and a PLC chip 3 are butt jointed while the PLC chip 2 is directly fixed to a convex portion of amount 1. The PLC chip 3 is floated over the mount 1, and thereby, the thermal stress attributed to a difference in thermal expansion between the PLC chip 3 and the mount 1 is suppressed and a coupling loss is reduced at a PLC chip connected portion. A filler 14 is filled between the PLC chip 3 and the mount 1, and the PLC chip 3 is further held by elastic adhesives 9a and 9b applied to the lateral surfaces of holding convex portions 10 mounted on the mount 1. This configuration avoids displacement of the PLC chip 3 in the up-and-down direction even when mechanical vibration or shock is applied in a direction perpendicular to a substrate, which is a direction most affecting the coupling loss at the PLC chip connected portion.

CITATION LIST

Patent Literature

PTL1: Japanese Patent Laid-Open No. 2009-175364

SUMMARY OF INVENTION

However, it is not easy to optimize the elastic adhesives 9a and 9b and the filler 14 so that an optical characteristic of the optical module is not degraded when mechanical vibration or the like is applied to the PLC chip 3, and therefore, further improvement is being demanded.

The present invention has been made in view of the above-mentioned drawback, and it is an object of the present invention to suppress degradation in an optical characteristic attributed to thermal stress and mechanical external force in an optical component that a part of a waveguide type optical device is fixed to a convex portion of a mount.

To accomplish such an object, an optical component according to a first aspect of the present invention is an optical component that a part of a waveguide type optical device is fixed to a convex portion of a mount and includes: an optical device support base fixed to a sidewall of an unfixed part, which is not fixed to the convex portion, of the waveguide type optical device; a presser member disposed on the optical device support base with being opposed to the mount; and a presser support base disposed on the mount to fix the presser member, and wherein the optical device support base is interposed between the mount and the presser member enough to be slidable in a direction parallel to surfaces of the mount and the presser member.

Furthermore, a second aspect of the present invention relates to the first aspect, and wherein the presser support base comprises first and second presser support bases that are opposed to each other and fix both ends of the presser member, and the optical device support base is interposed between the mount and the presser member at clearances and is slidable in a direction parallel to the surfaces of the mount and the presser member.

Furthermore, a third aspect of the present invention relates to the first or second aspect, and wherein the presser support base and the mount are integrated and form a case accommodating the waveguide type optical device.

Furthermore, a fourth aspect of the present invention relates to any of the first to third aspects, and wherein the optical device support base is set in a vicinity of an antinode of an amplitude of a vibration mode generated by vibration of the optical component in the unfixed part, which is not fixed to the convex portion, of the waveguide type optical device.

Furthermore, a fifth aspect of the present invention relates to any of the first to fourth aspects, and wherein fixation is performed by means of an ultraviolet curable adhesive, a thermosetting adhesive or welding of a solder between the optical device support base and the waveguide type optical device, between the presser member and the first and second presser support bases or between the presser support base and the mount.

Furthermore, a sixth aspect of the present invention relates to any of the first to fifth aspects, and wherein an interval between the optical device support base and the mount and an interval between the optical device support base and the presser member are respectively set to be 1 to 10 μm.

Furthermore, a seventh aspect of the present invention relates to any of the first to sixth aspects, and wherein the clearance between the optical device support base and at least either of the mount and the presser member is filled with a lubricating oil.

Furthermore, an eighth aspect of the present invention relates to any of the first to seventh aspects, and wherein the optical device support base is chamfered to reduce a contact area thereof with the mount and the presser member.

Furthermore, a ninth aspect of the present invention relates to any of the first to eighth aspects, and wherein a thermal expansion coefficient of a material of the optical device support base is approximately equal to a thermal expansion coefficient of the unfixed part, which is not fixed to the convex portion and to which the optical device support base is fixed, of the waveguide type optical device.

Furthermore, a tenth aspect of the present invention relates to any of the first to ninth aspects, and wherein the optical device support base is made of a polymer material.

Furthermore, an eleventh aspect of the present invention relates to a method of fabricating an optical component that a part of a waveguide type optical device is fixed to a convex portion of a mount and includes the steps of: fixing the waveguide type optical device to the convex portion; fixing an optical device support base to an unfixed part, which is not fixed to the mount, of the waveguide type optical device; disposing a presser member on the optical device support base with being opposed to the mount; and fixing the presser member by the presser support base on the mount, and wherein the optical device support base is interposed between the mount and the presser member enough to be slidable in a direction parallel to surfaces of the mount and the presser member.

According to the present invention, degradation in an optical characteristic attributed to thermal stress and mechanical external force can be suppressed by fixing a part of the waveguide type optical device composing the optical device to the convex portion of the mount and by holding the remaining part thereof in a slidable state.

BRIEF DESCRIPTION OF DRAWINGS

FIG. 2A is a diagram showing an optical component according to an embodiment 1;

FIG. 2B is a diagram showing the optical component according to the embodiment 1;

FIG. 4A is a diagram showing an optical component according to an embodiment 2;

FIG. 4B is a diagram showing the optical component according to the embodiment 2;

DESCRIPTION OF EMBODIMENTS

Figure 1A:
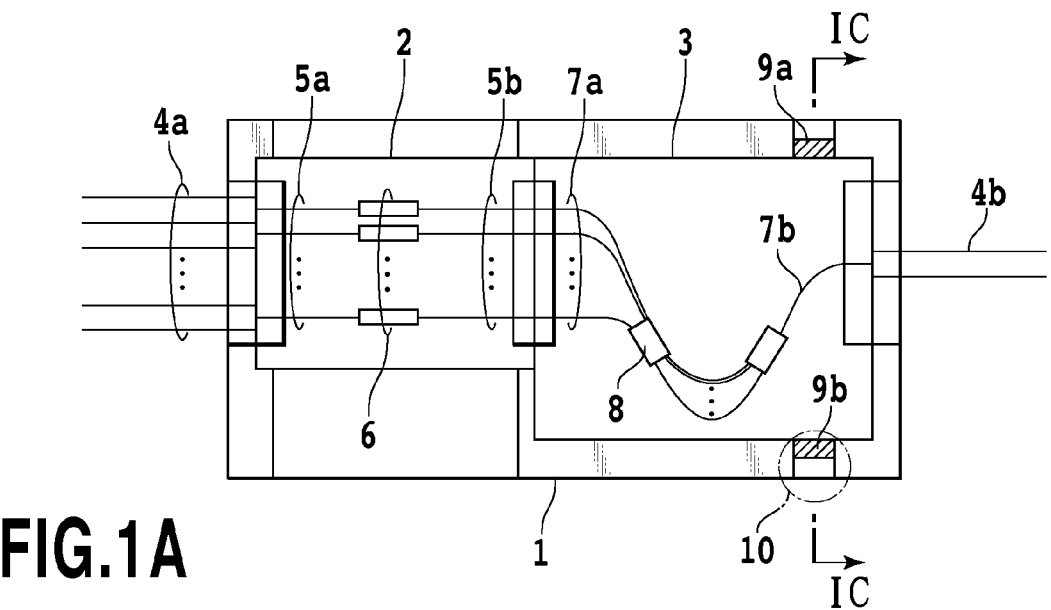
FIG. 1A is a diagram showing a conventional hybrid optical module.
Figure 1B:
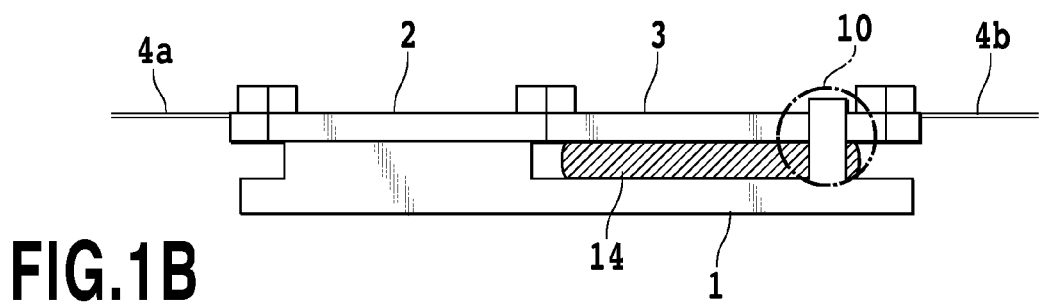
FIG. 1B is a diagram showing the conventional hybrid optical module.
Figure 1C:
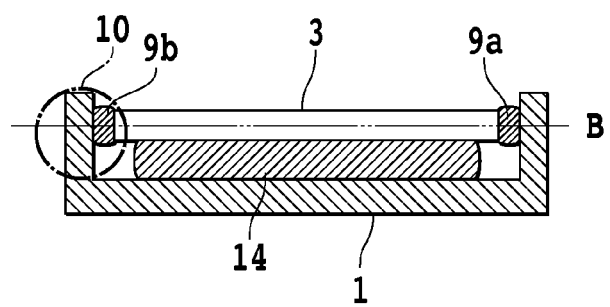
FIG. 1C is a diagram showing the conventional hybrid optical module.

Embodiments of the present invention will be hereinafter explained in detail with reference to the drawings.

Embodiment 1

FIGS. 2A and 2B show an optical component according to an embodiment 1. An optical component 200 includes a first waveguide type optical device 201 such as a PLC, a second waveguide type optical device 202 butt jointed to the first waveguide type optical device 201, and amount 210 having a convex portion 211 to which the first waveguide type optical device 201 is directly fixed. The mount 210 includes an optical fiber holding member 212 formed thereon, and an optical fiber 230 is connected to the first waveguide type optical device 201 by using the optical fiber holding member 212 and an optical fiber aligning member 220 connected to the first waveguide type optical device 201. The second waveguide type optical device 202 is floated over the mount, and thereby, thermal stress attributed to a difference in thermal expansion between the second waveguide type optical device 202 and the mount 210 is suppressed against a connected portion of the waveguide type optical device and the second waveguide type optical device 202 itself.

In the optical component according to the present embodiment, neither an elastic adhesive nor a filler is used for holding the second waveguide type optical device 202. A holding structure of the second waveguide type optical device 202 will be explained with reference to FIG. 3 that is a cross-sectional view taken along line III-III in FIG. 2B. First and second optical device support bases 301 and 302 are fixed to the second waveguide type optical device 202 by means of bonding, soldering or the like, while being opposed to each other on the both sidewalls of the second waveguide type optical device 202. First and second presser support bases 311 and 312 are mounted on the mount 210, and are also opposed to each other. A presser member 313 is disposed over the first and second optical device support bases 301 and 302, while the both ends thereof are fixed to the first and second presser support bases 311 and 312. The second waveguide type optical device 202 and the first and second optical device support bases 301 and 302 are slidable in a direction parallel to the surface of the mount 210 (a direction perpendicular to a plane of FIG. 3) without being fixed to the surrounding members thereof (i.e., the mount 210, the first and second presser support bases 311 and 312 and the presser member 313).

The second waveguide type optical device 202 is floated over the mount 210. In addition, the second waveguide type optical device 202 is not fixed to the mount 210 by means of a filler or an elastic adhesive. Thermal stress can be thereby remarkably suppressed against the connected portion of the waveguide type optical device and the second waveguide type optical device 202 itself even when a difference in thermal expansion exists between the second waveguide type optical device 202 and the mount 210. Furthermore, the first and second optical device support bases 301 and 302 are interposed between and adjacently to the mount 210 and the presser support base 313 enough to suppress the movement of the second waveguide type optical device 202 attributed to thermal stress, external force and the like, although not being fixed to the mount 210 and the presser support base 313. Therefore, even when mechanical vibration or shock is applied in a direction perpendicular to the surface of the mount 210, such a situation is avoided that the second waveguide type optical device 202 is displaced in the up-and-down direction and stress acts on the connected portion of the waveguide type optical device. Thus, the optical component of the present embodiment can suppress degradation in an optical characteristic attributed to thermal stress and mechanical external force by fixing a part of the waveguide type optical device to the convex portion of the mount and by holding the remaining part thereof in a slidable state.

In the present embodiment, the first and second optical device support bases 301 and 302 are fixed to the sidewalls of the second waveguide type optical device 202. Therefore, the first and second optical device support bases 301 and 302 can be fixed to the second waveguide type optical device 202 without greatly changing the waveguide layout and the shape of the second waveguide type optical device 202.

Where no constraint is imposed on the waveguide layout and the shape of the second waveguide type optical device 202, the first and second optical device support bases 301 and 302 can be also fixed to the front face and the back face of the second waveguide type optical device 202.

It should be noted that fixation can be achieved between the waveguide type optical device 202 and the first and second optical device support bases 301 and 302, between the first and second presser support bases 311 and 312 and the presser member 313, or between the presser support base 313 and the mount 210 by means of an ultraviolet curable adhesive, a thermosetting adhesive or welding using a solder or the like.

Furthermore, a lubricating oil may be filled in clearances between the first and second optical device support bases 301 and 302 and either the mount 210 or the presser member 313.

With the present embodiment, a V-AWG module in which an optical output is variable at each wavelength channel can be implemented, for instance, by fabricating the first waveguide type optical device 201 with a PLC type VOA and by fabricating the second waveguide type optical device 202 with a PLC type AWG.

Furthermore, the amplitude generated in the second waveguide type optical device 202 is highly effectively suppressed when the first and second optical device support bases 301 and 302, without being fixed, are set in the vicinity of an antinode of the amplitude of a vibration mode generated in the second waveguide type optical device 202. This corresponds to that the resonance frequency of the vibration mode is shifted toward a high frequency side.

Furthermore, the first and second optical device support bases 301 and 302 may be fabricated with a material having a thermal expansion coefficient approximately equal to that of the second waveguide type optical device 202 to which these bases are fixed. When the second waveguide type optical device 202 is a PLC, silicon, silica glass, borosilicate glass (Pyrex (registered trademark) glass) or the like can be applied as a material having a thermal expansion coefficient matched with that of the PLC. With the matching of the thermal expansion coefficients, the first and second optical device support bases 301 and 302 and the second waveguide type optical device 202 can be suppressed from being exfoliated from each other.

Furthermore, the presser member 313 may be made of a material having a thermal expansion coefficient matched with that of the mount 210. The matching of the thermal expansion coefficients can suppress a distortion to be caused due to a difference in thermal expansion coefficients between the presser member 313 and the mount 210. When the distortion is caused, the distance between the presser member 313 and the mount 210 varies. Therefore, chances are that a desired effect cannot be achieved because the first and second optical device support bases 301 and 302 are greatly moved, cannot be slid, or the like.

Alternatively, the first and second optical device support bases 301 and 302 may be fabricated with a polymer material (Teflon (registered trademark) or the like) as a material that places a priority on slidability.

Figure 8A:
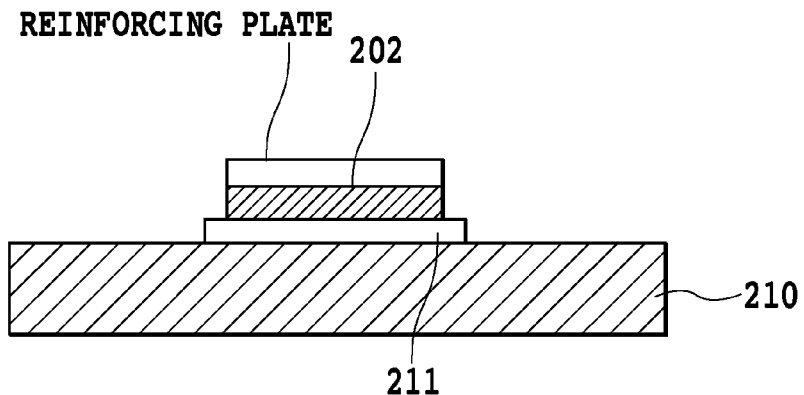
FIG. 8A is a diagram for explaining a method of fabricating the optical component of the embodiment 1.
Figure 8B:
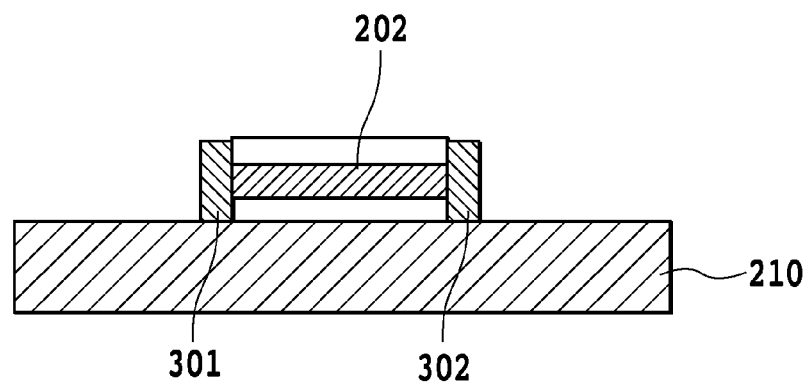
FIG. 8B is a diagram for explaining the method of fabricating the optical component of the embodiment 1.
Figure 8C:
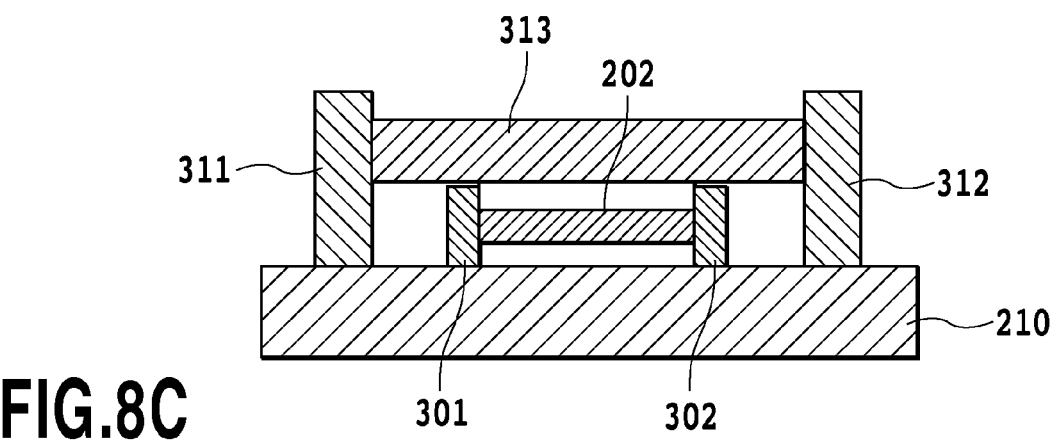
FIG. 8C is a diagram for explaining the method of fabricating the optical component of the embodiment 1.

Finally, a method of fabricating the optical component of the present embodiment will be explained (see FIGS. 8A to 8C). First, the first waveguide type optical device 201 and the second waveguide type optical device 202 are butt jointed so as to be optically coupled to each other (not shown in the drawings). Subsequently, the first waveguide type optical device 201 is fixed to the convex portion 211 of the mount 210 (FIG. 8A). Next, the first and second optical device support bases 301 and 302 are fixed to the sidewalls of the second waveguide type optical device 202 floated over the mount 210 (FIG. 8B). The first and second optical device support bases 301 and 302 are herein fixed while clearances are produced between the first and second optical device support bases 301 and 302 and the mount 210. For example, the first and second optical device support bases 301 and 302 are fixed in positions away from the mount 210 at a distance of 1 to 10 μm. The first and second optical device support bases 301 and 302 are herein fixed away from the mount 210 at a distance of 1 to 10 μm as a result of the experimental confirmation that an optical characteristic was not degraded in the connected portion of the first waveguide type optical device 201 and that of the second waveguide type optical device 202 when thermal stress or mechanical external force is applied thereto. Next, the presser member 313 is disposed on the first and second optical device support bases 301 and 302, while being opposed to the mount 210. Finally, the presser member 313 is fixed to the first and second presser support bases 311 and 312 opposed to each other, while clearances of roughly 1 to 10 μm, for instance, are produced between the presser member 313 and the first and second optical device support bases 301 and 302 (FIG. 8C). The values of the clearances between the first and second optical device support bases 301 and 302 and either the mount 210 or the presser member 313 are herein set in consideration of the mechanical strength and the optical characteristic of the optical component 200, and are controllable by using either a precision stage or a spacer. It should be noted that, even when the first and second optical device support bases 301 and 302 partially make contact with either the mount 210 or the presser member 313, a desired effect can be achieved if the first and second optical device support bases 301 and 302 are interposed between the mount 210 and the presser member 313 while being slidable in a direction parallel to the surface of the mount 210 and that of the presser member 313.

Embodiment 2

FIGS. 4A and 4B show an optical component according to an embodiment 2. An optical component 400 is greatly different from the optical component 200 of the embodiment 1 in that a presser support base and a mount are integrally formed as a case. Furthermore, the optical component 400 has a structure that three waveguide type optical devices are connected thereto.

The optical component 400 includes a first waveguide type optical device 401, a second waveguide type optical device 402 butt jointed to one end of the first waveguide type optical device 401, a third waveguide type optical device 402 butt jointed to the other end of the first waveguide type optical device 401, and a mount 410 having a convex portion 411 to which the first waveguide type optical device 401 is directly fixed. The mount 410 includes an optical fiber holding member 412 and an optical fiber 430 is connected to the second waveguide type optical device 402 by using the optical fiber holding member 412 and an optical fiber aligning member 420 connected to the second waveguide type optical device 402. The second waveguide type optical device 402 is floated over the mount, and thereby, thermal stress attributed to a difference in thermal expansion between the second waveguide type optical device 402 and the mount 410 is inhibited against the connected portion of the waveguide type optical device and the second waveguide type optical device 402 itself.

Figure 3:
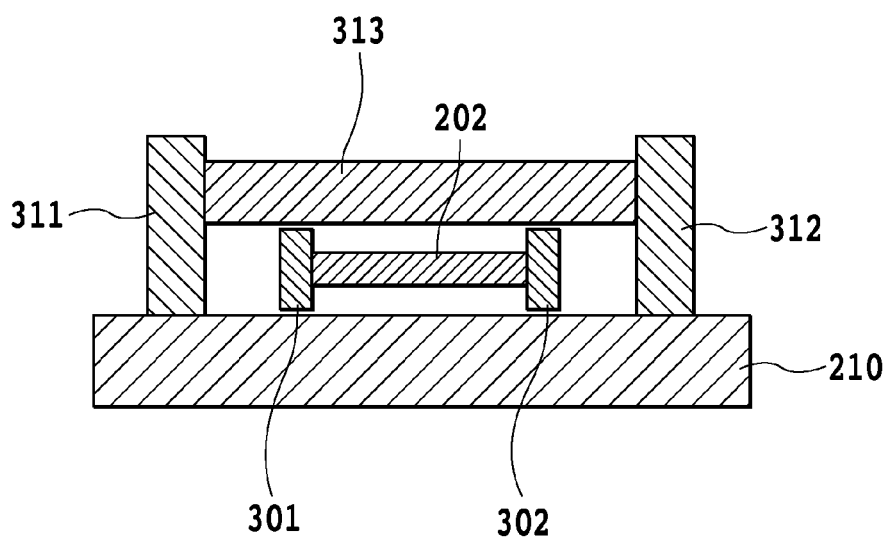
FIG. 3 is a cross-sectional view taken along line III-III in FIG. 2B.
Figure 5:
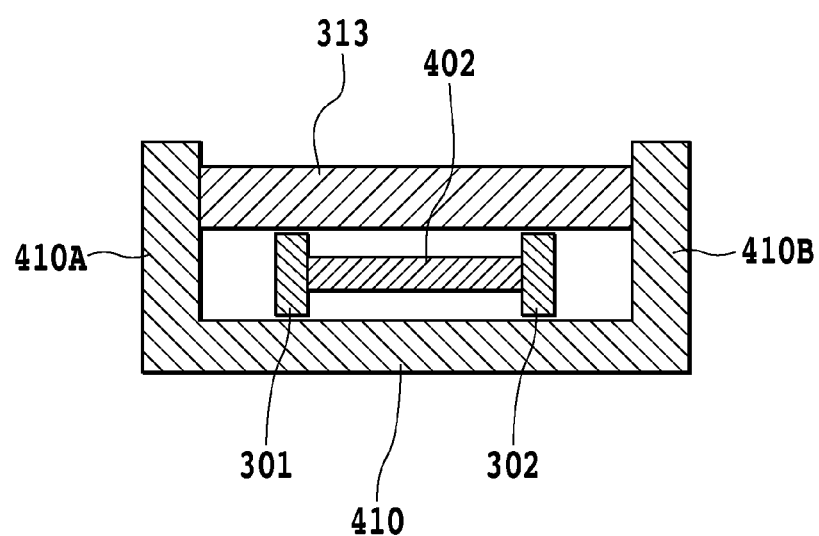
FIG. 5 is a cross-sectional view taken along line V-V in FIG. 4B.

A holding structure of the second waveguide type optical device 402 is shown in FIG. 5 that is a cross-sectional view taken along line V-V in FIG. 4B, but is the same as that of FIG. 3 except for that presser support bases are integrated with the mount. A part of the mount 410 plays roles of first and second presser support bases 410A and 410B and the presser member 313 is fixed thereto.

The number of components can be reduced by integrating the first and second presser support bases 410A and 410B and the mount 410 as a case. Therefore, the number of assembling steps can be reduced and size reduction can be also achieved. Moreover, the first and second presser support bases 410A and 410B and the mount 410 are made of the same material and are configured without using an adhesive or the like. Therefore, a difference in thermal expansion can be reduced in a direction perpendicular to the mount 410 and a clearance can be kept approximately constant between the presser member 313 and the mount 410.

It should be noted that, similarly to the embodiment 1, a lubricating oil may be filled in the clearance, for instance.

Furthermore, in the third waveguide type optical device 403 of FIGS. 4A and 4B, a ray-directional end surface of the third waveguide type optical device 403 is open ended and corresponds to an antinode of a vibration mode, and therefore, a single optical device support base 404 is disposed for holding the open end.

A presser member 405 is disposed on an optical device support base 404 and three sides of the presser member 405 are fixed to three presser support bases integrated with the mount 410. In other words, in the present embodiment, the three sides of the mount 410 function as the presser support bases.

In the present embodiment, the single optical device support base 404 is fixed to the third waveguide type optical device 403. However, depending on the structure of the waveguide type optical device 403, the resonance frequency of the vibration mode may still fall in a range of the vibration frequency in usage environment and may degrade an optical characteristic. In such a case, an optical device support base may be added for further shifting the resonance frequency toward a high frequency side.

In short, depending on the vibration mode of each waveguide type optical device, the number of optical device support bases to be fixed to the waveguide type optical device can be changed.

According to the present embodiment, a RZ-DQPSK module can be implemented, for instance, by fabricating the first waveguide type optical device 401 with a LN substrate and fabricating the second waveguide type optical device 402 and the third waveguide type optical device 403 with silica-based PLCs.

Embodiment 3

Figure 6:
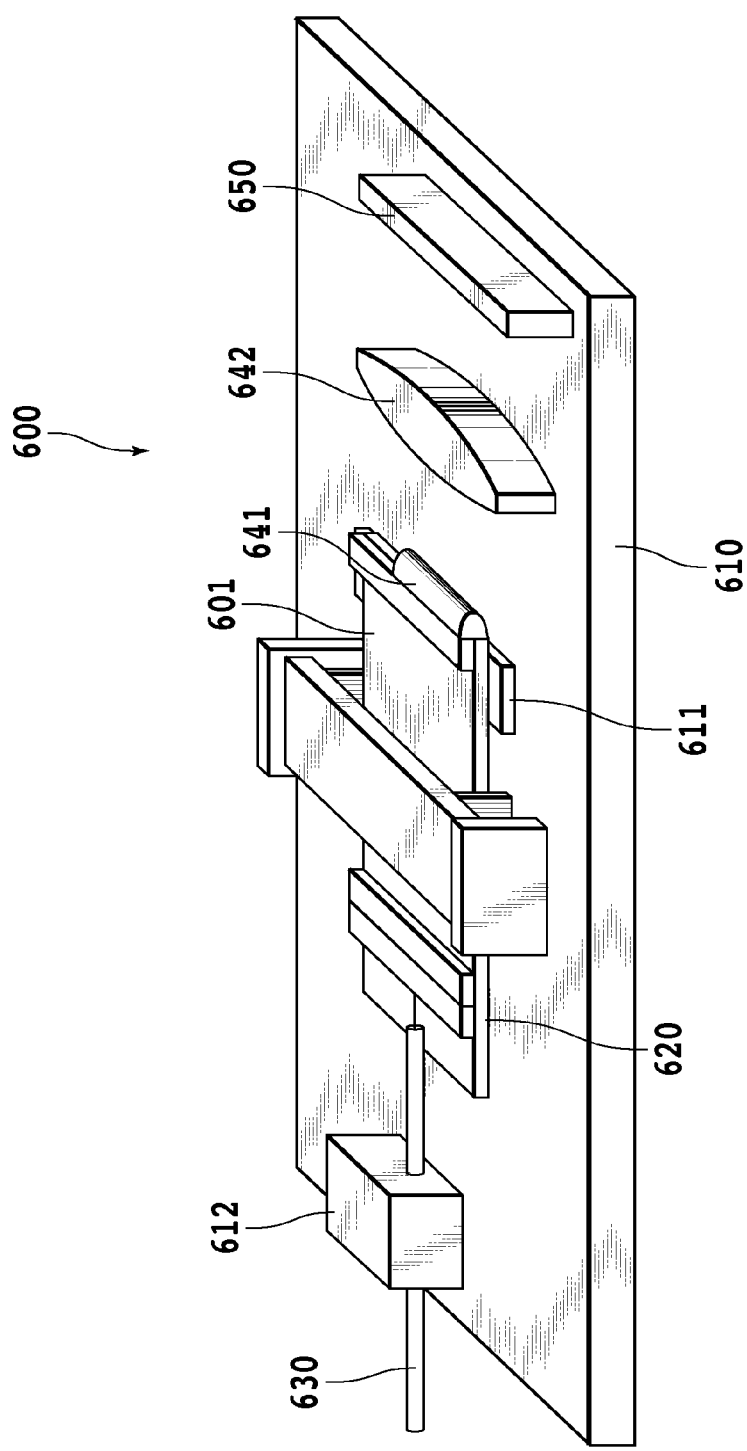
FIG. 6 is a diagram showing an optical component according to an embodiment 3.

FIG. 6 shows an optical component according to an embodiment 3. An optical component 600 is not of a type that multiple waveguide type optical devices are connected as described in the embodiments 1 and 2 but of a type that a spatial phase modulator as a spatial optical component and a waveguide type optical device are optically coupled.

The optical component 600 includes a waveguide type optical device 601 and a mount 610 having a convex portion 611 to which a part of the waveguide type optical device 601 is directly fixed. The mount 610 includes an optical fiber holding member 612 formed thereon and an optical fiber 630 is connected to the waveguide type optical device 601 by using an optical fiber holding member 612 and an optical fiber aligning member 620 connected to the waveguide type optical device 601. An unfixed part of the waveguide type optical device 601 is floated over the mount 610, and thereby, thermal stress attributed to a difference in thermal expansion between the waveguide type optical device 601 and the mount 610 is suppressed against the waveguide type optical device 601. A holding structure of the waveguide type optical device 601 is the same as that explained with reference to FIG. 3 and is not, therefore, herein explained.

A first lens 641 is fixed to an end surface, disposed opposite to the end surface to which the optical fiber aligning member 620 is connected, of the waveguide type optical device 601. The waveguide type optical device 601 is fixed at a portion thereof in the vicinity of the end surface to which the first lens 641 is fixed. After passing through the first lens 641, light passes through a second lens 642 fixed to the mount 610 and enters a spatial phase modulator 650 such as a LCOS on the mount 610.

In general, the mount 610 for fixing spatial optical components including the second lens 641, the spatial phase modulator 650 and the like is fabricated with a material having a small thermal expansion coefficient (e.g., invar).

Figure 7A:
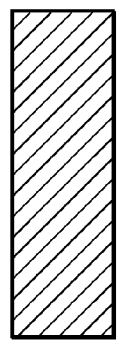
FIG. 7A is a diagram showing a cross-sectional shape of an optical device support base.
Figure 7B:
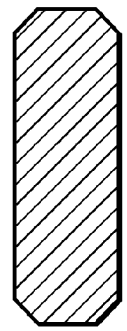
FIG. 7B is a diagram showing a cross-sectional shape of an optical device support base.

As the optical device support base, the one with a cross-section formed in a quadrangular shape, a chamfered quadrangular shape or the like can be applied (see FIGS. 7A and 7B). As to the chamfered one, a contact area is reduced between the optical device support base and the mount and between the optical device support base and the presser member. This is also similarly true of the embodiments 1 and 2.

It should be noted that the expression "a part of the waveguide type optical device" is used in the present specification and this encompasses both of the cases of: one or more of the multiple connected waveguide type optical devices as described in the embodiments 1 and 2; and a portion of the single waveguide type optical device as described in the embodiment 3.

According to this embodiment, a TODC module can be implemented, for instance, by fabricating the waveguide type optical device with a PLC type AWG.

The invention claimed is:

1. A method of fabricating an optical component, comprising:
   fixing a first portion of a waveguide type optical device to a convex portion of a mount;
   fixing a second portion of the waveguide type optical device to an optical device support base which is not fixed to the mount;
   disposing a presser member on the optical device support base; and
   fixing the presser member to a presser support base disposed on the mount,
   wherein the optical device support base is interposed between the mount and the presser member so as to be slidable with respect to the mount and the presser member in a direction parallel to surfaces of the mount and the presser member.

2. An optical component adapted to receive a waveguide type optical device having first and second portions, the optical component comprising:
   a mount having a convex portion adapted to fixedly receive the first portion of the waveguide type optical device;
   one or more presser support bases fixed to and extending upward from the mount;
   a presser member fixed to the one or more presser support bases so as to be spaced apart from the mount;
   one or more optical device support bases adapted to fixedly receive the second portion of the waveguide type optical device, the one or more optical device support bases being interposed between the presser member and the mount so as to be slidable with respect to the mount and the presser member in a direction parallel to a top surface of the mount.

3. An optical component adapted to receive a waveguide type optical device having first and second portions, the optical component comprising:
a mount having a convex portion adapted to fixedly receive the first portion of the waveguide type optical device;
an optical device support base adapted to fixedly receive a sidewall of the second portion of the waveguide type optical device, the optical device support base being slideably positioned on the mount;
a presser member disposed on the optical device support base; and
a presser support base disposed on the mount and fixed to the presser member,
wherein the optical device support base is interposed between the mount and the presser member so as to be slidable with respect to the mount and the presser member in a direction parallel to surfaces of the mount and the presser member.

4. The optical component according to claim 3, wherein the optical device support base is set in a vicinity of an antinode of an amplitude of a vibration mode generated by vibration of the optical component in the unfixed part, which is not fixed to the convex portion, of the waveguide type optical device.

5. The optical component according to claim 4, wherein fixation is performed by means of an ultraviolet curable adhesive, a thermosetting adhesive or welding of a solder between the optical device support base and the waveguide type optical device, between the presser member and the first and second presser support bases or between the presser support base and the mount.

6. The optical component according to claim 3, wherein an interval between the optical device support base and the mount and an interval between the optical device support base and the presser member are respectively set to be 1 to 10 µm.

7. The optical component according to claim 3, wherein the clearance between the optical device support base and at least either of the mount and the presser member is filled with a lubricating oil.

8. The optical component according to claim 3, wherein the optical device support base is chamfered to reduce a contact area thereof with the mount and the presser member.

9. The optical component according to claim 3, wherein a thermal expansion coefficient of a material of the optical device support base is approximately equal to a thermal expansion coefficient of the unfixed part, which is not fixed to the convex portion and to which the optical device support base is fixed, of the waveguide type optical device.

10. The optical component according to claim 3, wherein the optical device support base is made of a polymer material.

11. The optical component according to claim 3, wherein the presser support base comprises first and second presser support bases opposed to each other, the first and second presser support bases fixing both ends of the presser member, and
the optical device support base is interposed between the mount and the presser member at clearances and is slidable in a direction parallel to the surfaces of the mount and the presser member.

12. The optical component according to claim 11, wherein the presser support base and the mount are integrated and form a case accommodating the waveguide type optical device.

13. The optical component according to claim 12, wherein the optical device support base is set in a vicinity of an antinode of an amplitude of a vibration mode generated by vibration of the optical component in the unfixed part, which is not fixed to the convex portion, of the waveguide type optical device.

14. The optical component according to claim 12, wherein fixation is performed by means of an ultraviolet curable adhesive, a thermosetting adhesive or welding of a solder between the optical device support base and the waveguide type optical device, between the presser member and the first and second presser support bases or between the presser support base and the mount.

15. The optical component according to claim 11, wherein the optical device support base is set in a vicinity of an antinode of an amplitude of a vibration mode generated by vibration of the optical component in the unfixed part, which is not fixed to the convex portion, of the waveguide type optical device.

16. The optical component according to claim 15, wherein fixation is performed by means of an ultraviolet curable adhesive, a thermosetting adhesive or welding of a solder between the optical device support base and the waveguide type optical device, between the presser member and the first and second presser support bases or between the presser support base and the mount.

17. The optical component according to claim 11, wherein fixation is performed by means of an ultraviolet curable adhesive, a thermosetting adhesive or welding of a solder between the optical device support base and the waveguide type optical device, between the presser member and the first and second presser support bases or between the presser support base and the mount.

18. The optical component according to claim 3, wherein the presser support base and the mount are integrated and form a case accommodating the waveguide type optical device.

19. The optical component according to claim 18, wherein the optical device support base is set in a vicinity of an antinode of an amplitude of a vibration mode generated by vibration of the optical component in the unfixed part, which is not fixed to the convex portion, of the waveguide type optical device.

20. The optical component according to claim 18, wherein fixation is performed by means of an ultraviolet curable adhesive, a thermosetting adhesive or welding of a solder between the optical device support base and the waveguide type optical device, between the presser member and the first and second presser support bases or between the presser support base and the mount.

21. The optical component according to claim 3, wherein fixation is performed by means of an ultraviolet curable adhesive, a thermosetting adhesive or welding of a solder between the optical device support base and the waveguide type optical device, between the presser member and the first and second presser support bases or between the presser support base and the mount.

* * * * *